(12) United States Patent
Holz et al.

(10) Patent No.: US 10,349,036 B2
(45) Date of Patent: *Jul. 9, 2019

(54) AUGMENTED REALITY WITH MOTION SENSING

(71) Applicant: Leap Motion, Inc., San Francisco, CA (US)

(72) Inventors: David S. Holz, San Francisco, CA (US); Neeloy Roy, San Francisco, CA (US); Hongyuan He, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/821,499

(22) Filed: Aug. 7, 2015

(65) Prior Publication Data

US 2016/0044298 A1 Feb. 11, 2016

Related U.S. Application Data

(60) Provisional application No. 62/035,008, filed on Aug. 8, 2014.

(51) Int. Cl.
*H04N 13/02* (2006.01)
*G06T 19/00* (2011.01)
(Continued)

(52) U.S. Cl.
CPC ....... *H04N 13/239* (2018.05); *G02B 27/0093* (2013.01); *G02B 27/017* (2013.01); *G02B 27/22* (2013.01); *G06F 3/011* (2013.01); *G06F 3/017* (2013.01); *G06T 19/006* (2013.01); *H04N 5/2253* (2013.01); *H04N 5/2256* (2013.01); *H04N 5/332* (2013.01); *H04N 13/257* (2018.05); *H04N 13/296* (2018.05); *G02B 2027/0134* (2013.01); *G02B 2027/0138* (2013.01); *G02B 2027/0187* (2013.01);
(Continued)

(58) Field of Classification Search
CPC .... G02B 2027/0134; G02B 2027/0187; G02B 27/0093; G02B 27/22; G06F 3/017; G06T 19/006; H04N 5/332
See application file for complete search history.

(56) References Cited

U.S. PATENT DOCUMENTS

| 5,900,849 | A | 5/1999 | Gallery | |
|---|---|---|---|---|
| 2013/0044128 | A1* | 2/2013 | Liu | G09G 5/00 345/633 |
| 2013/0182077 | A1* | 7/2013 | Holz | H04N 5/232 348/46 |

OTHER PUBLICATIONS

CN 2014204535364—Office Action dated Nov. 5, 2014, 1 page.
(Continued)

*Primary Examiner* — Gims S Philippe
*Assistant Examiner* — Mainul Hasan
(74) *Attorney, Agent, or Firm* — Haynes Beffel & Wolfeld LLP; Ernest J. Beffel, Jr.

(57) ABSTRACT

The technology relates to a motion sensory and imaging device capable of acquiring imaging information of the scene and providing at least a near real time pass-through of imaging information to a user. The sensory and imaging device can be used stand-alone or coupled to a wearable or portable device to create a wearable sensory system capable of presenting to the wearer the imaging information augmented with virtualized or created presentations of information.

19 Claims, 5 Drawing Sheets

(51) Int. Cl.
- *G02B 27/22* (2018.01)
- *G06F 3/01* (2006.01)
- *H04N 5/225* (2006.01)
- *H04N 5/33* (2006.01)
- *H04N 13/239* (2018.01)
- *H04N 13/257* (2018.01)
- *H04N 13/296* (2018.01)
- *G02B 27/01* (2006.01)
- *G02B 27/00* (2006.01)
- *H04S 7/00* (2006.01)

(52) U.S. Cl.
CPC ........... *H04S 7/304* (2013.01); *H04S 2400/11* (2013.01); *H04S 2400/15* (2013.01)

(56) References Cited

OTHER PUBLICATIONS

CN 2014204535364—Response to Nov. 5 Office Action filed Feb. 26, 2015, 8 pages.
CN 2014204535364—Notice of Allowance dated Apr. 17, 2015, 3 pages.

\* cited by examiner

AUGMENTED REALITY WITH MOTION SENSING

CROSS-REFERENCE TO OTHER APPLICATIONS

This application claims the benefit of U.S. Provisional Patent Application No. 62/035,008, entitled "AUGMENTED REALITY WITH MOTION SENSING", filed 8 Aug. 2014, which is hereby incorporated by reference for all purposes.

TECHNICAL FIELD

The technology disclosed relates to highly functional/highly accurate sensory and imaging device for use in wearable sensor systems capable of detecting gestures in a three dimensional (3D) sensory space using imaging or other sensors and presenting a 3D augmented reality to a user.

BACKGROUND

One class of devices, such as Google Glass, provides the capability to present information superimposed on a see through screen worn by a user. Another type of device, such as Oculus Rift, provides a virtual reality display to the user devoid of information from the real world surrounding the user. Both of these types of devices fail, however, to adequately provide for integration of virtual (e.g., computational) information into a real time image stream that reflects the environment surrounding the wearer. A need therefore exists for highly functional sensory and imaging device capable of acquiring imaging information of the scene and providing at least a near real time pass-through of imaging information to a user. The sensory and imaging device ideally could be coupled to a wearable or portable device to create a wearable sensory system capable of presenting to the wearer the imaging information augmented with virtualized or created presentations of information. No devices heretofore known provide these capabilities.

SUMMARY

Implementations of the technology disclosed address these and other problems by providing motion sensory and imaging device capable of acquiring imaging information of the scene and providing at least a near real time pass-through of imaging information to a user. The sensory and imaging device can be used stand-alone or coupled to a wearable or portable device to create a wearable sensory system capable of presenting to the wearer the imaging information augmented with virtualized or created presentations of information.

One implementation of a motion sensory and imaging device includes a plurality of imaging sensors arranged to provide stereoscopic imaging information for a scene being viewed; one or more illumination sources arranged about the imaging sensors; and a controller coupled to the imaging sensors and illumination sources to control operation thereof. The controller enables the device to acquire imaging information of the scene, and provide at least a near real time pass-through of imaging information to a user. The device can be coupled to a wearable device to create a wearable sensory systems capable of presenting to the wearer the imaging information augmented with virtualized or created presentations of information.

In one implementation, a motion sensory and imaging device further captures imaging information for control objects—including control objects such as human hands—within the viewpoint of the imaging sensors. The imaging information for control objects of interest can be used to determine gesture information indicating a command to a machine under control. In implementations, the device enables detecting positions, poses and motions of objects surrounding the wearer of the device with sub-millimeter accuracy and providing this information for integration into the presentation provided to the wearer.

In one implementation, a motion sensory and imaging device includes capabilities to separate information received from pixels sensitive to IR light from information received from pixels sensitive to visible light, e.g., RGB (red, green, and blue) and processing image information from IR (infrared) sensors to be used for gesture recognition and image information from RGB sensors to be provided as a live video feed via a presentation interface. For example, a video stream including a sequence of images of a scene in the real world is captured using cameras having a set of RGB pixels and a set of IR pixels. Information from the IR sensitive pixels is separated out for processing to recognize gestures. Information from the RGB sensitive pixels is provided to a presentation interface of a wearable device (HUD, HMD, etc.) as a live video feed to a presentation output. The presentation output is displayed to a user of the wearable device. One or more virtual objects can be integrated with the video stream images to form the presentation output. Accordingly, the device is enabled to provide any of gesture recognition, a real world presentation of real world objects via pass through video feed, and/or an augmented reality including virtual objects integrated with a real world view.

In one implementation, a motion sensory and imaging device can be used for tracking motion of the device itself using a combination a RGB and IR pixels of the cameras. In particular, it relates to capturing gross or coarse features and corresponding feature values of a real world space using RGB pixels and capturing fine or precise features and corresponding feature values of the real world space using IR pixels. Once captured, motion information of the wearable sensor system with respect to at least one feature of the scene is determined based on comparison between feature values detected at different time instances. For instance, a feature of a real world space is an object at a given position in the real world space, and then the feature value can be the three-dimensional (3D) co-ordinates of the position of the object in the real world space. If, between pairs of image frame or other image volume, the value of the position co-ordinates changes, then this can be used to determine motion information of the wearable sensory system with respect to the object whose position changed between image frames.

In another example, a feature of a real world space is a wall in the real world space and the corresponding feature value is orientation of the wall as perceived by a viewer engaged with a wearable sensor system. In this example, if a change in the orientation of the wall is registered between successive image frames captured by a camera electronically coupled to the wearable sensor system, then this can indicate a change in the position of the wearable sensor system that views the wall.

According to one implementation, information from RGB pixels of a camera can be used to identify an object in the real world space along with prominent or gross features of the object from an image or sequence of images such as object contour, shape, volumetric model, skeletal model, silhouettes, overall arrangement and/or structure of objects in a real world space. This can be achieved by measuring an average pixel intensity of a region or varying textures of regions. Thus, RGB pixels allow for acquisition of a coarse estimate of the real world space and/or objects in the real world space.

Further, data from the IR pixels can be used to capture fine or precise features of the real world space, which enhance the data extracted from RGB pixels. Examples of fine features include surface textures, edges, curvatures, and other faint features of the real world space and objects in the real world space. In one example, while RGB pixels capture a solid model of a hand, IR pixels are used capture the vein and/or artery patterns or fingerprints of the hand.

Some other implementations can include capturing image data by using the RGB and IR pixels in different combinations and permutations. For example, one implementation can include simultaneously activating the RGB and IR pixels to perform a whole scale acquisition of image data, without distinguishing between coarse or detail features. Another implementation can include using the RGB and IR pixels intermittently. Yet another implementation can include activating the RGB and IR pixels according to a quadratic or Gaussian function. Some other implementations can include performing a first scan using the IR pixels followed by an RGB scan, and vice-versa.

In one implementation, the ambient lighting conditions are determined and can be used to adjust display of output. For example, information from the set of RGB pixels is displayed in normal lighting conditions and information from the set of IR pixels in dark lighting conditions. Alternatively, or additionally, information from the set of IR pixels can be used to enhance the information from the set of RGB pixels for low-light conditions, or vice versa. Some implementations will receive from a user a selection indicating a preferred display chosen from one of color imagery from the RGB pixels and IR imagery from the IR pixels, or combinations thereof. Alternatively, or additionally, the device itself may dynamically switch between video information captured using RGB sensitive pixels and video information captured using IR sensitive pixels for display depending upon ambient conditions, user preferences, situational awareness, other factors, or combinations thereof.

In one implementation, information from the IR sensitive pixels is separated out for processing to recognize gestures; while the information from the RGB sensitive pixels is provided to an output as a live video feed; thereby enabling conserving bandwidth to the gesture recognition processing. In gesture processing, features in the images corresponding to objects in the real world can be detected. The features of the objects are correlated across multiple images to determine change, which can be correlated to gesture motions. The gesture motions can be used to determine command information to a machine under control, application resident thereon or combinations thereof.

In one implementation, motion sensors and/or other types of sensors are coupled to a motion-capture system to monitor motion of at least the sensor of the motion-capture system resulting from, for example, users' touch. Information from the motion sensors can be used to determine first and second positional information of the sensor with respect to a fixed point at first and second times. Difference information between the first and second positional information is determined. Movement information for the sensor with respect to the fixed point is computed based upon the difference information. The movement information for the sensor is applied to apparent environment information sensed by the sensor to remove motion of the sensor therefrom to yield actual environment information; which can be communicated. Control information can be communicated to a system configured to provide a virtual reality or augmented reality experience via a portable device and/or to systems controlling machinery or the like based upon motion capture information for an object moving in space derived from the sensor and adjusted to remove motion of the sensor itself. In some applications, a virtual device experience can be augmented by the addition of haptic, audio and/or visual projectors.

In an implementation, apparent environmental information is captured from positional information of an object portion at the first time and the second time using a sensor of the motion-capture system. Object portion movement information relative to the fixed point at the first time and the second time is computed based upon the difference information and the movement information for the sensor.

In further implementations, a path of the object is calculated by repeatedly determining movement information for the sensor, using the motion sensors, and the object portion, using the sensor, at successive times and analyzing a sequence of movement information to determine a path of the object portion with respect to the fixed point. Paths can be compared to templates to identify trajectories. Trajectories of body parts can be identified as gestures. Gestures can indicate command information to be communicated to a system. Some gestures communicate commands to change operational modes of a system (e.g., zoom in, zoom out, pan, show more detail, next display page, and so forth).

Advantageously, some implementations can enable improved user experience, greater safety and improved functionality for users of wearable devices. Some implementations further provide capability to motion capture systems to recognize gestures, allowing the user to execute intuitive gestures involving virtualized contact with a virtual object. For example, a device can be provided a capability to distinguish motion of objects from motions of the device itself in order to facilitate proper gesture recognition. Some implementations can provide improved interfacing with a variety of portable or wearable machines (e.g., smart telephones, portable computing systems, including laptop, tablet computing devices, personal data assistants, special purpose visualization computing machinery, including heads up displays (HUD) for use in aircraft or automobiles for example, wearable virtual and/or augmented reality systems, including Google Glass, and others, graphics processors, embedded microcontrollers, gaming consoles, or the like; wired or wirelessly coupled networks of one or more of the foregoing, and/or combinations thereof), obviating or reducing the need for contact-based input devices such as a mouse, joystick, touch pad, or touch screen. Some implementations can provide for improved interface with computing and/or other machinery than would be possible with heretofore known techniques. In some implementations, a richer human—machine interface experience can be provided.

Other aspects and advantages of the present technology can be seen on review of the drawings, the detailed description and the claims, which follow.

DESCRIPTION

Figure 1:
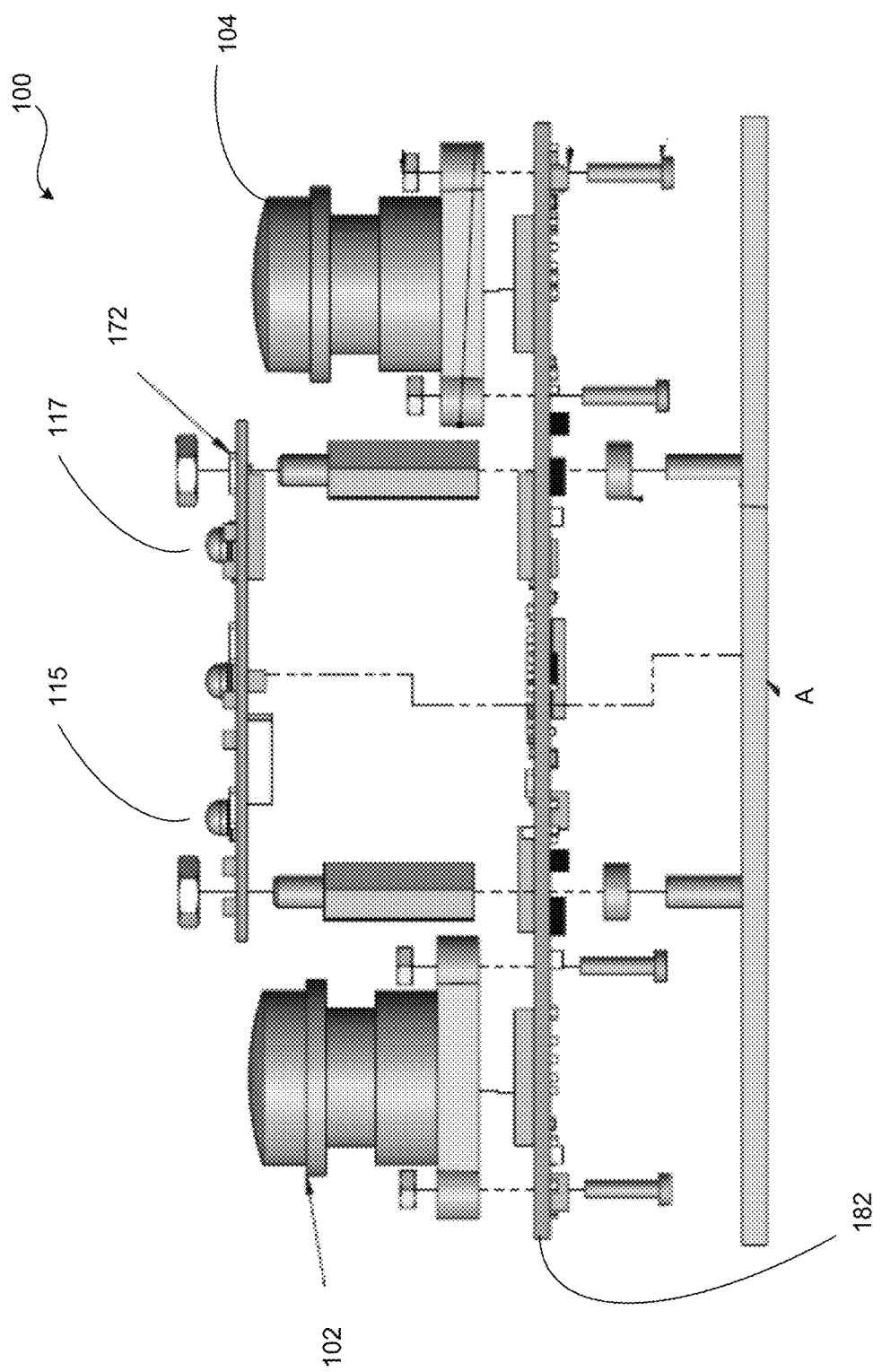
FIG. 1 shows an example motion sensory and imaging device.

The technology disclosed relates to a motion sensory and imaging devices capable of capturing real or near real time images of a scene, detecting a gesture in 3D sensory space and interpreting the gesture as a command to a system or machine under control, and providing the captured image information and the command when appropriate.

Implementations include providing a "pass-through" in which live video is provided to the user of the virtual reality device, either alone or in conjunction with display of one or more virtual objects, enabling the user to perceive the real world directly. For example, the user is enabled to see an actual desk environment as well as virtual applications or objects intermingled therewith. Gesture recognition and sensing enables implementations to provide the user with the ability to grasp or interact with objects real (e.g., the user's coke can) alongside the virtual (e.g., a virtual document floating above the surface of the user's actual desk. In some implementations, information from differing spectral sources is selectively used to drive one or another aspect of the experience. For example, information from IR sensitive sensors can be used to detect the user's hand motions and recognize gestures. While information from the visible light region can be used to drive the pass through video presentation, creating a real world presentation of real and virtual objects. In a further example, combinations of image information from multiple sources can be used; the system—or the user—selecting between IR imagery and visible light imagery based upon situational, conditional, environmental or other factors or combinations thereof. For example, the device can switch from visible light imaging to IR imaging when the ambient light conditions warrant. The user can have the ability to control the imaging source as well. In yet further examples, information from one type of sensor can be used to augment, correct, or corroborate information from another type of sensor. Information from IR sensors can be used to correct the display of imaging conducted from visible light sensitive sensors, and vice versa. In low-light or other situations not conducive to optical imaging, where free-form gestures cannot be recognized optically with a sufficient degree of reliability, audio signals or vibrational waves can be detected and used to supply the direction and location of the object as further described herein.

The technology disclosed can be applied to enhance user experience in immersive virtual reality environments using wearable sensor systems. Examples of systems, apparatus, and methods according to the disclosed implementations are described in a "wearable sensor systems" context. The examples of "wearable sensor systems" are being provided solely to add context and aid in the understanding of the disclosed implementations. In other instances, examples of gesture-based interactions in other contexts like automobiles, robots, or other machines can be applied to virtual games, virtual applications, virtual programs, virtual operating systems, etc. Other applications are possible, such that the following examples should not be taken as definitive or limiting either in scope, context, or setting. It will thus be apparent to one skilled in the art that implementations can be practiced in or outside the "wearable sensor systems" context.

Refer first to FIG. 1, which shows an example motion sensory device 100 that includes an illumination board 172 coupleable to a main board 182 with threaded fasteners or otherwise. Cabling (not shown in FIG. 1 for clarity sake) makes electrical interconnection between illumination board 172 and main board 182 permitting exchange of signals and power flow. The fasteners that fasten the main board 182 (first portion) and the illumination board 172 (second portion) can further fasten these portions to a mounting surface A of a wearable or portable electronic device (e.g., an HMD, HUD, smartphone, or the like). The mounting surface A can be a surface (internal or external) of a wearable or portable electronic device. Alternatively, the device can be disposed within a cavity or receptacle of wearable or portable electronic device using a friction fit, fasteners or any combination thereof. Device 100 can be embedded in any of a variety of a wearable or portable electronic device to meet design requirements of a wide variety of applications.

The illumination board 172 has a number of individually controllable illumination sources 115, 117, which can be LEDs for example, embedded thereon. Two cameras 102, 104 provide stereoscopic image-based sensing of a scene being viewed and reside on the main board 182 of device 100 in the illustrated implementation. The main board 182 may also include a processor for basic image processing, control of the cameras 102, 104 and the LEDs of board 172. Various modifications of the design shown in FIG. 1 are possible; for example the number and arrangement of LEDs, photo-detectors, and cameras may vary, the scanning and imaging hardware may be integrated on a single board, or both depending upon the requirements of a particular application.

Stereoscopic imaging information provided by cameras 102, 104 is provided selectively or continuously to a user wearing or carrying the wearable or portable electronic device. The device 100 can provide live "real time" or near real time feed of image information from the cameras, real time or near real time imaging information augmented by computer generated graphics, information, icons or other virtualized presentations, virtualized representations of the scene being viewed, time varying combinations selected therefrom. Gestures made by a user can be sensed by the cameras 102, 104 of the sensory device 100, as well, and the resulting imaging information can be provided to a motion capture system to identify and determine commands to any system (including the wearable or portable device itself) under control from the gestures. Advantageously, integrating gesture recognition with imaging capabilities into a single motion sensory device 100 provides a highly functional, flexible, yet compact device suited to installation in wearable or portable electronic devices, and so forth.

Some of the illumination sources 115, 117 can have associated focusing optics (not shown by FIG. 1 for clarity sake) in some implementations. Either board 172 or 182 may also include a socket(s) for coupling photo-detector(s) (or other sensors) not shown by FIG. 1 for clarity sake. Information from a photo-detector sensing changes in reflectance indicating presence or absence of objects within a region of space into which the illumination sources emit light during a "scanning" of the region of space by the illumination sources, e.g., LEDs.

Figure 2:
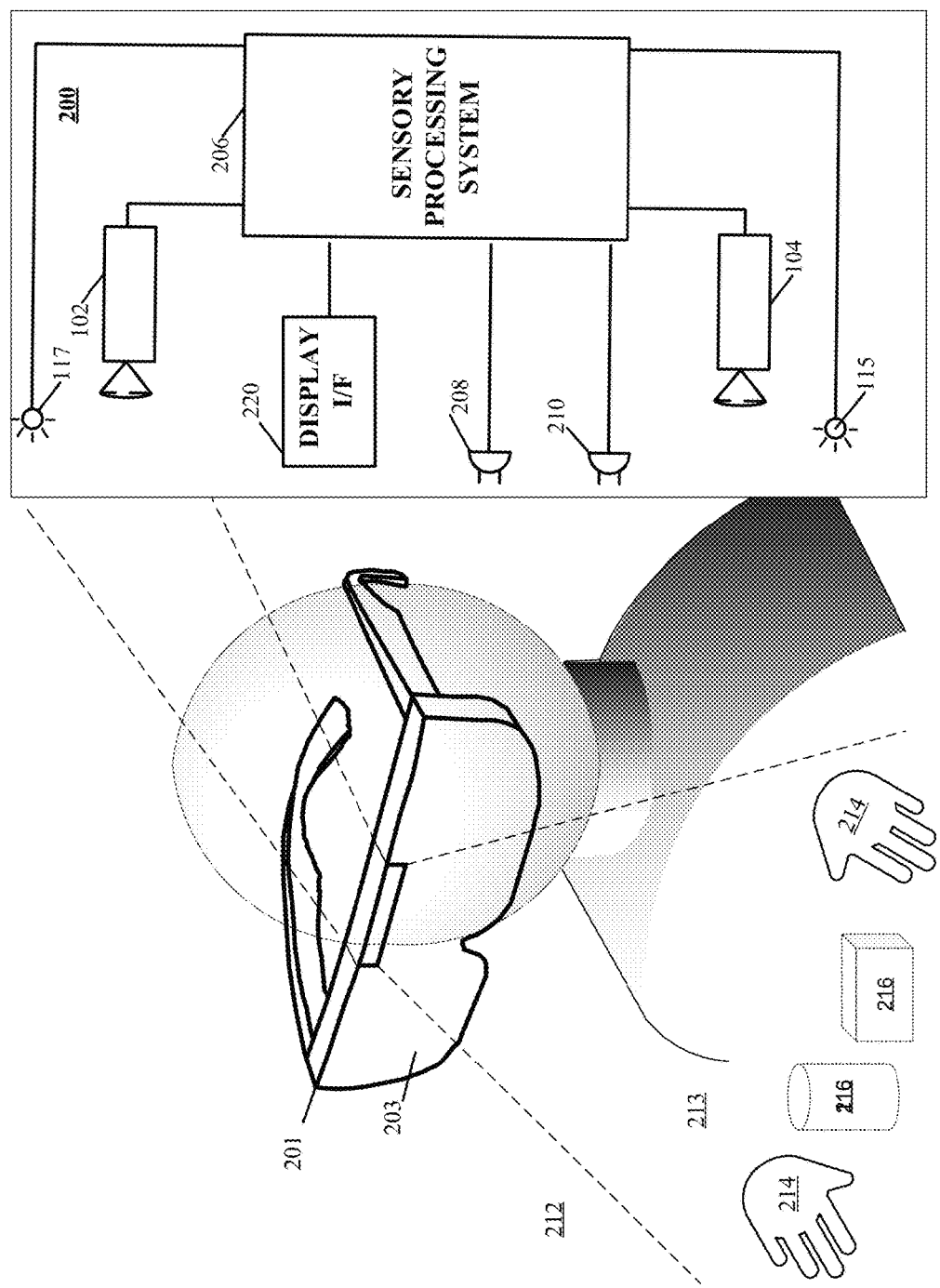
FIG. 2 shows an example wearable sensory system based upon a motion sensory and imaging device.

Now with reference to FIG. 2, which illustrates a system 200 for capturing image data according to one implementation of the technology disclosed. System 200 is preferably coupled to a wearable device 201 that can be a personal head mounted display (HMD) having a goggle form factor such as shown in FIG. 2, a helmet form factor, or can be incorporated into or coupled with a watch, smartphone, or other type of portable device, forming a wearable sensory system.

In various implementations, the system and method for capturing 3D motion of an object as described herein can be integrated with other applications, such as a head-mounted device or a mobile device. Referring again to FIG. 2, a head-mounted device 201 can include an optical assembly 203 that displays a surrounding environment or a virtual environment to the user; incorporation of the motion-capture system 200 in the head-mounted device 201 allows the user to interactively control the displayed environment. For example, a virtual environment can include virtual objects that can be manipulated by the user's hand gestures, which are tracked by the motion-capture system 200. In one implementation, the motion-capture system 200 integrated with the head-mounted device 201 detects a position and shape of user's hand and projects it on the display of the head-mounted device 201 such that the user can see her gestures and interactively control the objects in the virtual environment. This can be applied in, for example, gaming or internet browsing.

System 200 includes some cameras 102, 104 coupled to sensory processing system 206. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a substantially constant rate of about 15 frames per second or so); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 102, 104 can be oriented toward portions of a region of interest 212 by motion of the device 201, in order to view a virtually rendered or virtually augmented view of the region of interest 212 that can include a variety of virtual objects 216 as well as contain an object of interest 214 (in this example, one or more hands) that moves within the region of interest 212. One or more sensors 208, 210 capture motions of the device 201. In some implementations, one or more light sources 115, 117 are arranged to illuminate the region of interest 212. In some implementations, one or more of the cameras 102, 104 are disposed opposite the motion to be detected, e.g., where the hand 214 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 206, which can be, e.g., a computer system, can control the operation of cameras 102, 104 to capture images of the region of interest 212 and sensors 208, 210 to capture motions of the device 201. Information from sensors 208, 210 can be applied to models of images taken by cameras 102, 104 to cancel out the effects of motions of the device 201, providing greater accuracy to the virtual experience rendered by device 201. Based on the captured images and motions of the device 201, sensory processing system 206 determines the position and/or motion of object 214 and render representations thereof to the user via assembly 203.

For example, as an action in determining the motion of object 214, sensory processing system 206 can determine which pixels of various images captured by cameras 102, 104 contain portions of object 214. In some implementations, any pixel in an image can be classified as an "object" pixel or a "background" pixel depending on whether that pixel contains a portion of object 214 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 and cancelling out captured motions of the device 201 from sensors 208, 210 allows sensory processing system 206 to determine the location in 3D space of object 214, and analyzing sequences of images allows sensory processing system 206 to reconstruct 3D motion of object 214 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 220 employs projection techniques in conjunction with the sensory based tracking in order to present virtual (or virtualized real) objects (visual, audio, haptic, and so forth) created by applications loadable to, or in cooperative implementation with, the optical assembly 203 of device 201 to provide a user of the device with a personal virtual experience. Projection can include an image or other visual representation of an object.

Figure 5:
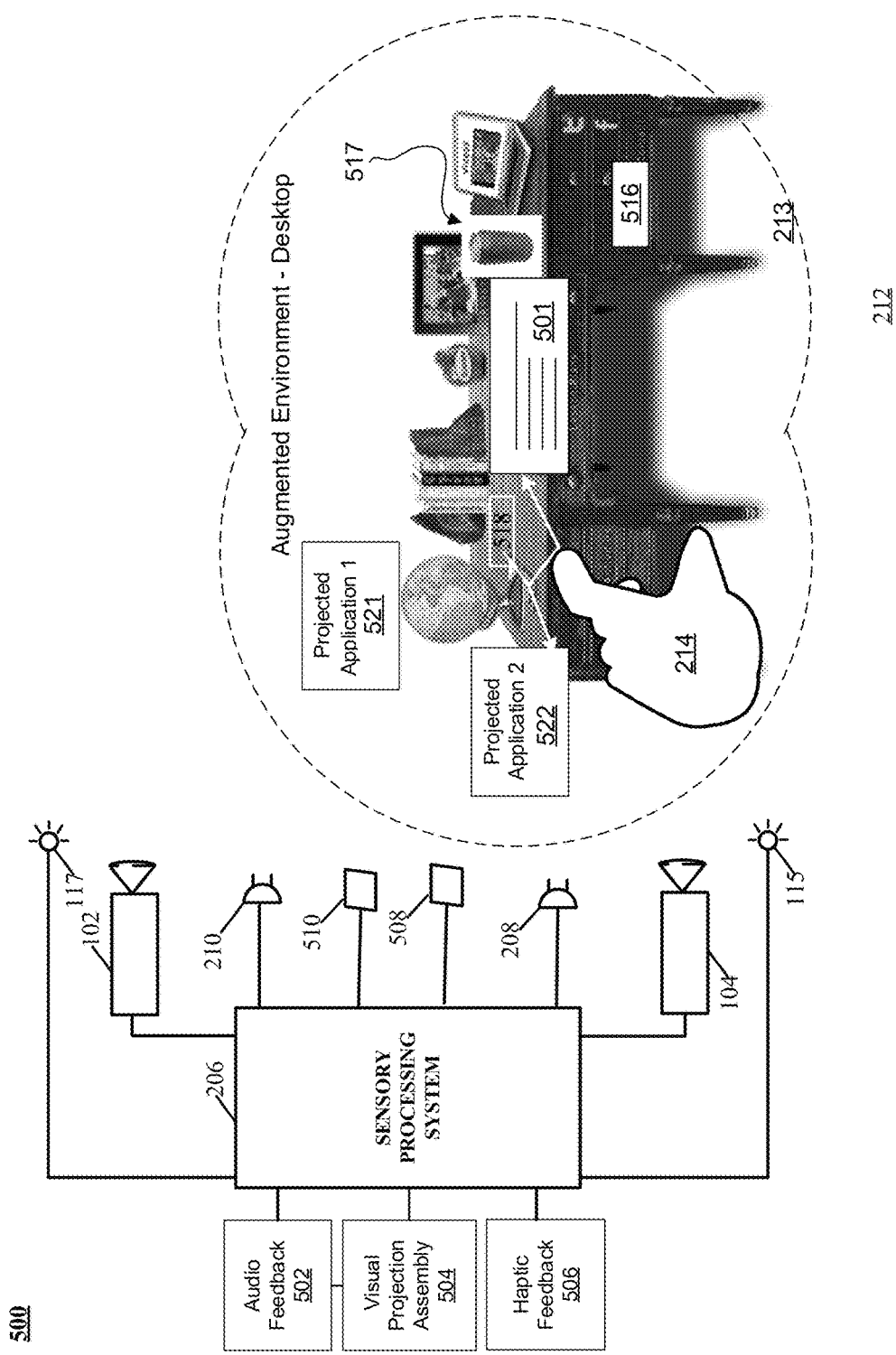
FIG. 5 shows an example augmented reality pass-through presented by a motion sensory and imaging capable device.

One implementation uses motion sensors and/or other types of sensors coupled to a motion-capture system to monitor motions within a real environment. A virtual object integrated into an augmented rendering of a real environment can be projected to a user of a portable device 201. Motion information of a user body portion can be determined based at least in part upon sensory information received from imaging 102, 104 or acoustic or other sensory devices. Control information is communicated to a system based in part on a combination of the motion of the portable device 201 and the detected motion of the user determined from the sensory information received from imaging 102, 104 or acoustic or other sensory devices. The virtual device experience can be augmented in some implementations by the addition of haptic, audio and/or other sensory information projectors. For example, with reference to FIG. 5, a visual projection assembly 504 can project an image of a page (e.g., virtual device 501) from a virtual book object superimposed upon a real world object, e.g., desk 216 being displayed to a user via live video feed; thereby creating a virtual device experience of reading an actual book, or an electronic book on a physical e-reader, even though no book nor e-reader is present. A haptic projector 506 can project the feeling of the texture of the "virtual paper" of the book to the reader's finger. An audio projector 502 can project the sound of a page turning in response to detecting the reader making a swipe to turn the page. Because it is an augmented reality world, the back side of hand 214 is projected to the user, so that the scene looks to the user as if the user is looking at the user's own hand(s).

Again with reference to FIG. 2, a plurality of sensors 208, 210 are coupled to the sensory processing system 206 to capture motions of the device 201. Sensors 208, 210 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 200 can include any of various other sensors not shown in FIG. 2 for clarity, alone or in various combinations, to enhance the virtual experience provided to the user of device 201. For example, in low-light situations where free-form gestures cannot be recognized optically with a sufficient degree of reliability, system 206 may switch to a touch mode in which touch gestures are recognized based on acoustic or vibrational sensors. Alternatively, system 206 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 206 from a standby mode to an operational mode. For example, the system 206 may enter the standby mode if optical signals from the cameras 102, 104 are absent for longer than a threshold interval.

It will be appreciated that the items shown in FIG. 2 are illustrative. In some implementations, it may be desirable to house the system 200 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Figure 3:
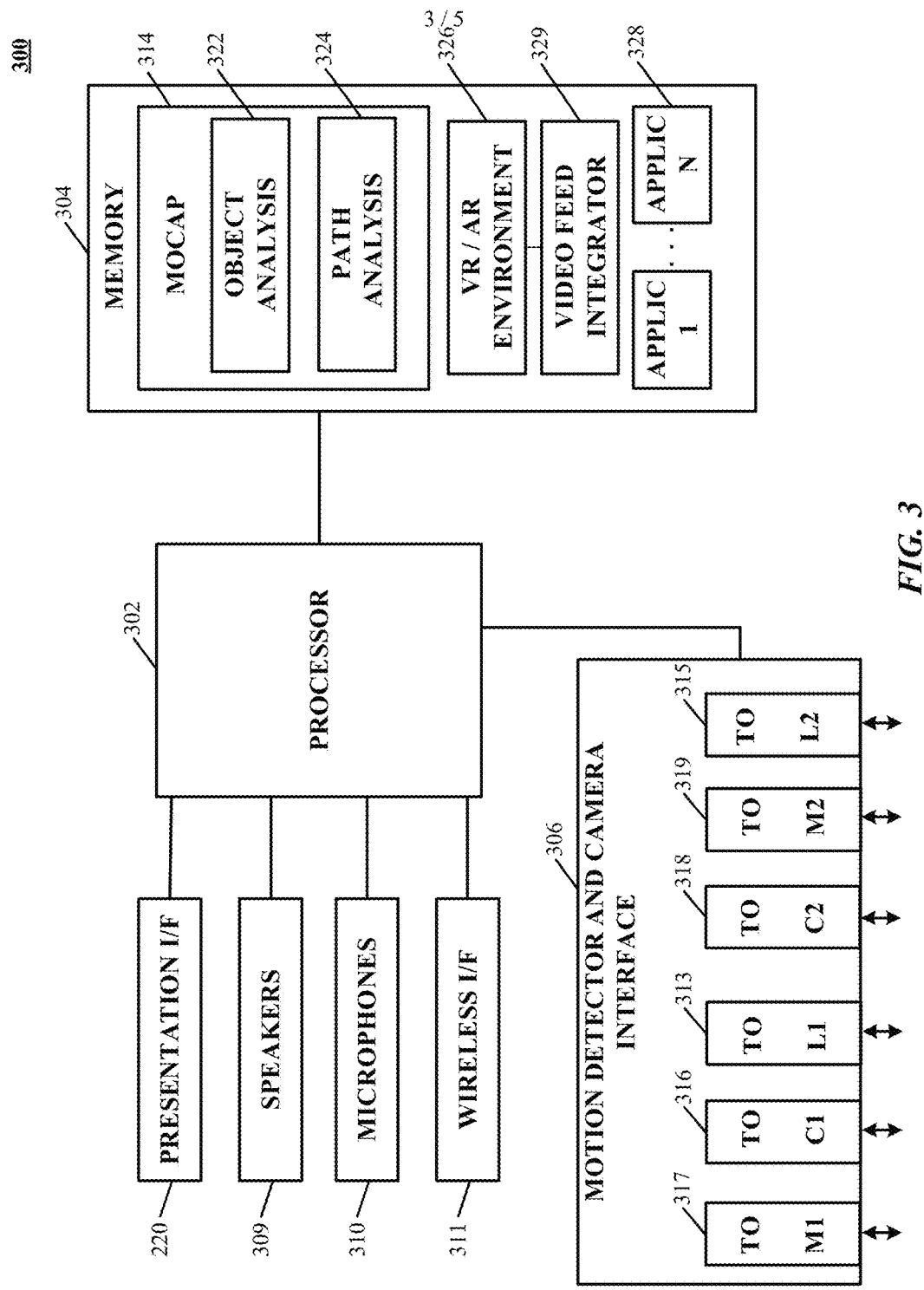
FIG. 3 shows a simplified block diagram of a computer system.

Refer now to FIG. 3, which shows a simplified block diagram of a computer system 300 for implementing sensory processing system 206. Computer system 300 includes a processor 302, a memory 304, a motion detector and camera interface 306, a presentation interface 220, speaker(s) 309, a microphone(s) 310, and a wireless interface 311. Memory 304 can be used to store instructions to be executed by processor 302 as well as input and/or output data associated with execution of the instructions. In particular, memory 304 contains instructions, conceptually illustrated as a group of modules described in greater detail below, that control the operation of processor 302 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 302 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Motion detector and camera interface 306 can include hardware and/or software that enables communication between computer system 300 and cameras 102, 104, as well as sensors 208, 210 (see FIG. 2). Thus, for example, motion detector and camera interface 306 can include one or more camera data ports 316, 318, illumination source ports 313, 315 and motion detector ports 317, 319 to which the cameras, illumination sources and motion detectors can be connected (via conventional plugs and jacks), as well as hardware and/or software signal processors to modify data signals received from the cameras and motion detectors (e.g., to reduce noise or reformat data) prior to providing the signals as inputs to a motion-capture ("mocap") program 314 executing on processor 302. In some implementations, motion detector and camera interface 306 can also transmit signals to the cameras, illumination sources and sensors, e.g., to activate or deactivate them, to control camera settings (frame rate, image quality, sensitivity, etc.), to control illumination settings (intensity, duration, etc.), to control sensor settings (calibration, sensitivity levels, etc.), or the like. Such signals can be transmitted, e.g., in response to control signals from processor 302, which may in turn be generated in response to user input or other detected events.

Instructions defining mocap program 314 are stored in memory 304, and these instructions, when executed, perform motion-capture analysis on images supplied from cameras and audio signals from sensors connected to motion detector and camera interface 306. In one implementation, mocap program 314 includes various modules, such as an object analysis module 322 and a path analysis module 324. Object analysis module 322 can analyze images (e.g., images captured via interface 306) to detect edges of an object therein and/or other information about the object's location. In some implementations, object analysis module 322 can also analyze audio signals (e.g., audio signals captured via interface 306) to localize the object by, for example, time distance of arrival, multilateration or the like. ("Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC). Path analysis module 324 can track and predict object movements in 3D based on information obtained via the cameras. Some implementations will include a Virtual Reality/Augmented Reality environment manager 326 provides integration of virtual objects reflecting real objects (e.g., hand 214) as well as synthesized objects 216 for presentation to user of device 201 via presentation interface 220 to provide a personal virtual experience 213. One or more applications 328 can be loaded into memory 304 (or otherwise made available to processor 302) to augment or customize functioning of device 201 thereby enabling the system 200 to function as a platform. Successive camera images are analyzed at the pixel level to extract object movements and velocities. Audio signals place the object on a known surface, and the strength and variation of the signals can be used to detect object's presence. If both audio and image information is simultaneously available, both types of information can be analyzed and reconciled to produce a more detailed and/or accurate path analysis. A video feed integrator 329 provides integration of live video feed from the cameras 102, 104 and one or more virtual objects (e.g., 501 of FIG. 5). Video feed integrator 329 governs processing of video information from disparate types of cameras 102, 104. For example, information received from pixels sensitive to IR light and from pixels sensitive to visible light (e.g., RGB) can be separated by integrator 329 and processed differently. Image information from IR sensors can be used for gesture recognition, while image information from RGB sensors can be provided as a live video feed via presentation interface 220. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. Integrator 329 in conjunction with VR/AR environment manager 326 control the creation of the environment presented to the user via presentation interface 220.

Presentation interface 220, speakers 309, microphones 310, and wireless network interface 311 can be used to facilitate user interaction via device 201 with computer system 300. These components can be of generally conventional design or modified as desired to provide any type of user interaction. In some implementations, results of motion capture using motion detector and camera interface 306 and mocap program 314 can be interpreted as user input. For example, a user can perform hand gestures or motions across a surface that are analyzed using mocap program 314, and the results of this analysis can be interpreted as an instruction to some other program executing on processor 302 (e.g., a web browser, word processor, or other application). Thus, by way of illustration, a user might use upward or downward swiping gestures to "scroll" a webpage currently displayed to the user of device 201 via presentation interface 220, to use rotating gestures to increase or decrease the volume of audio output from speakers 309, and so on. Path analysis module 324 may represent the detected path as a vector and extrapolate to predict the path, e.g., to improve rendering of action on device 201 by presentation interface 220 by anticipating movement.

It will be appreciated that computer system 300 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object analysis module 322 by processor 302 can cause processor 302 to operate motion detector and camera interface 306 to capture images and/or audio signals of an object traveling across and in contact with a surface to detect its entrance by analyzing the image and/or audio data.

Figure 4:
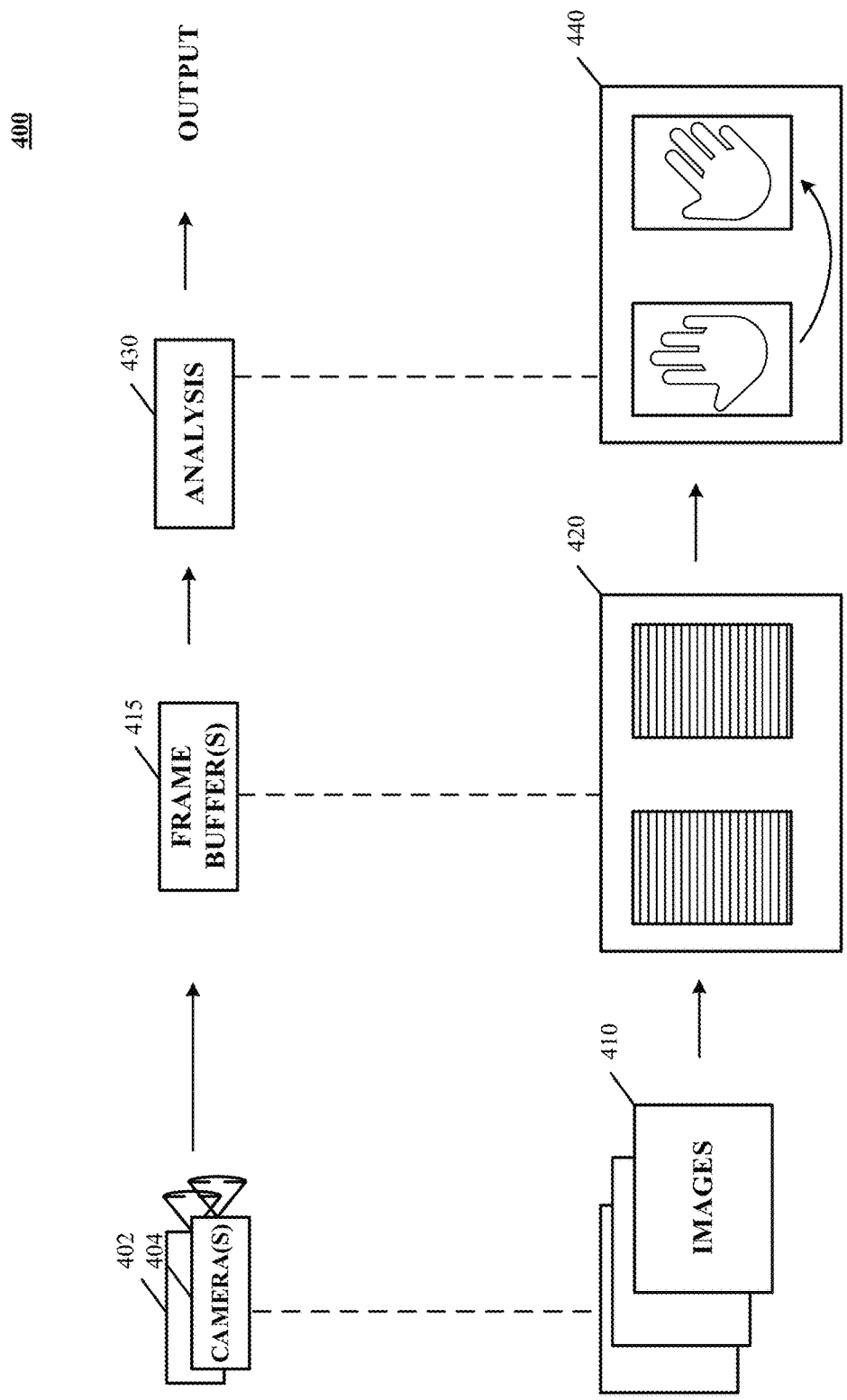
FIG. 4 shows basic operations and functional units involved in motion capture and image analysis.

FIG. 4 depicts the basic operations and functional units 400 involved in motion capture and image analysis in accordance with implementations of the technology disclosed. As shown in FIG. 4, the camera(s) 402, 404 record digital images 410 of a scene. Each digital image is captured as an array of pixel values by the associated camera's image sensor, and the digital images are transferred—either in "raw" format or following conventional preprocessing—to one or more frame buffers 415. A frame buffer is a partition or dedicated segment of volatile memory that stores a "bitmapped" image frame 420 corresponding to the pixel values of an image as output by the camera that recorded it. The bitmap is generally organized conceptually as a grid, with each pixel mapped one-to-one or otherwise to output elements of a display. It should be stressed, however, that the topology of how memory cells are physically organized within the frame buffers 415 does not matter and need not conform directly to the conceptual organization.

The number of frame buffers included in a system generally reflects the number of images simultaneously analyzed by the analysis system or module 430, which is described in greater detail below. Briefly, analysis module 430 analyzes the pixel data in each of a sequence of image frames 420 to locate objects therein and track their movement over time (as indicated at 440). This analysis can take various forms, and the algorithm performing the analysis dictates how pixels in the image frames 420 are handled. For example, the algorithm implemented by analysis module 430 can process the pixels of each frame buffer on a line-by-line basis—i.e., each row of the pixel grid is successively analyzed. Other algorithms can analyze pixels in columns, tiled areas, or other organizational formats.

In various implementations, the motion captured in a series of camera images is used to compute a corresponding series of output images for display on the display 220. For example, camera images of a moving hand can be translated into a wire-frame or other graphic depiction of the hand by the processor 302. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, e.g., one of the frame buffers 415. A video display controller reads out the frame buffer to generate a data stream and associated control signals to output the images to the assembly 203. Video display control provided by presentation interface 220 can be provided along with the processor 302 and memory 304 on-board the motherboard of the computer system 300, and can be integrated with the processor 302 or implemented as a co-processor that manipulates a separate video memory. As noted, the computer system 300 can be equipped with a separate graphics or video card that aids with generating the feed of output images for the assembly 203. One implementation includes a video card generally having a graphics processing unit (GPU) and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU and the main processor 302 in various ways.

Suitable algorithms for motion-capture program 314 are described below as well as, in more detail, in U.S. Ser. Nos. 61/587,554, 13/414,485, 61/724,091, 13/724,357, and 13/742,953, filed on Jan. 17, 2012, Mar. 7, 2012, Nov. 8, 2012, Dec. 21, 2012 and Jan. 16, 2013, respectively, which are hereby incorporated herein by reference in their entirety. The various modules can be programmed in any suitable programming language, including, without limitation high-level languages such as C, C++, C#, OpenGL, Ada, Basic, Cobra, FORTRAN, Java, Lisp, Perl, Python, Ruby, or Object Pascal, or low-level assembly languages.

Again with reference to FIG. 4, the modes of operation of a device equipped with a motion sensory control device can determine the coarseness of the data provided to the image-analysis module 430, the coarseness of its analysis, or both in accordance with entries in a performance database. For example, during a wide-area mode of operation, the image-analysis module 430 can operate on every image frame and on all data within a frame, capacity limitations can dictate analysis of a reduced amount of image data per frame (i.e., resolution) or discarding of some frames altogether if the data in each of the frame buffers 415 are organized as a sequence of data lines. The manner in which data is dropped from the analysis can depend on the image-analysis algorithm or the uses to which the motion-capture output is put. In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 430 (e.g., in defining the contour of an object) are collectively referred to as "image-analysis parameters." The foregoing examples of acquisition parameters and image-analysis parameters are representative only, and not limiting.

Acquisition parameters can be applied to the cameras 402, 404 and/or to the frame buffers 415. The camera 402, 404 for example, can be responsive to acquisition parameters in operating the cameras 402, 404 to acquire images at a commanded rate, or can instead limit the number of acquired frames passed (per unit time) to the frame buffers 415. Image-analysis parameters can be applied to the image-analysis module 430 as numerical quantities that affect the operation of the contour-defining algorithm.

The desirable values for acquisition parameters and image-analysis parameters appropriate to a given level of available resources can depend, for example, on the characteristics of the image-analysis module 430, the nature of the application utilizing the mocap output, and design preferences. Whereas some image-processing algorithms can be able to trade off a resolution of contour approximation against input frame resolution over a wide range, other algorithms may not exhibit much tolerance at all—requiring, for example, a minimal image resolution below which the algorithm fails altogether.

Some implementations can be applied to virtual reality or augmented reality applications. For example, and with reference to FIG. 5, which illustrates a system 500 for projecting a virtual device augmented reality experience 213 including a view of real objects, e.g., a desk surface medium 516, and one or more virtualized objects (e.g., object 501) according to one implementation of the technology disclosed. System 500 includes a processing system 206 controlling a variety of sensors and projectors, such as for example one or more cameras 102, 104 (or other image sensors) and optionally some illumination sources 115, 117 comprising an imaging system. Optionally, a plurality of vibrational (or acoustical) sensors 508, 510 positioned for sensing contacts with desk 516 can be included. Optionally projectors under control of system 206, such as an optional audio projector 502 to provide for example audio feedback, optional video projector 504, an optional haptic projector 506 to provide for example haptic feedback to a user to augment reality. For further information on projectors, reference may be had to "Visio-Tactile Projector" Youtube (https://www.youtube.com/watch?v=Bb0hNMxxewg) (accessed Jan. 15, 2014). In operation, sensors and projectors are oriented toward a region of interest 212, that can include at least a portion of a desk 516, or free space in which an object of interest 214 (in this example, a hand) moves along the indicated path 518. One or more applications 521 and 522 can be provided as virtual objects integrated into the display of the augmented reality 213. Accordingly, user (e.g., owner of hand 214) is able to interact with real objects e.g., desk 516, cola 517, in the same environment as virtual objects 501.

In some implementations, a virtual device is projected to a user. Projection can include an image or other visual representation of an object. For example, visual projection mechanism 504 of FIG. 5 can project a page (e.g., virtual device 501) from a book into augmented reality environment 213 (e.g., surface portion 516 and/or surrounding space 212) of a reader; thereby creating a virtual device experience of reading an actual book, or an electronic book on a physical e-reader, even though no book nor e-reader is present. In some implementations, optional haptic projector 506 can project the feeling of the texture of the "virtual paper" of the book to the reader's finger. In some implementations, optional audio projector 502 can project the sound of a page turning in response to detecting the reader making a swipe to turn the page.

The invention claimed is:

1. A device, including:
a plurality of imaging sensors, including a first set of infrared pixels sensitive to infrared light and a second set of red-green-blue pixels sensitive to visible light; wherein imaging sensors are arranged to provide stereoscopic imaging information for a scene in front of a user wearing a coupled wearable or portable device that blocks the scene from being viewed including at least one hand, said at least one hand belonging to the user wearing the coupled wearable or portable device and moving within the scene, and wherein said at least one hand is blocked from being viewed by the user;
one or more illumination sources arranged to direct illumination towards the at least one hand; and
a controller coupled to the imaging sensors and illumination sources to control operation thereof, including:
operating the imaging sensors and illumination sources to acquire imaging information of the scene, including capturing imaging information for at least one hand within view of the imaging sensors; wherein at least part of the at least one hand is illuminated by the one or more illumination sources;
separating imaging information received from infrared pixels sensitive to infrared light from imaging information received from red-green-blue pixels sensitive to visible light;
processing imaging information from infrared pixels to determine gesture information of a user indicating a command to a machine under control;
processing imaging information from red-green-blue pixels to be provided as a live video feed via a presentation interface; and
providing at least: i) gestural information of the at least one hand determined using the imaging information from infrared pixels for the at least one hand; and ii) a display of the live video feed including imaging information of the scene for presentation to a user via a coupled wearable or portable device worn by a user; wherein the user wearing the coupled wearable or portable device is devoid of visual information from the scene surrounding the user other than from the live video feed.

2. The device of claim 1, wherein the processing imaging information from infrared pixels further includes:
extracting fine features of a real world space using infrared pixels that capture infrared components of illumination in the scene.

3. The device of claim 2, wherein fine features of the real world space include surface texture of the real world space.

4. The device of claim 2, wherein fine features of the real world space include edges of the real world space.

5. The device of claim 2, wherein fine features of the real world space include curvatures of the real world space.

6. The device of claim 2, wherein fine features of the real world space include surface texture of objects in the real world space.

7. The device of claim 2, wherein fine features of the real world space include edges of objects in the real world space.

8. The device of claim 2, wherein fine features of the real world space include curvatures of objects in the real world space.

9. The device of claim 1,
wherein the controller further provides:
determining ambient lighting conditions;
adjusting display of output based upon the ambient lighting conditions determined, including:
dynamically switching display between video information captured using red-green-blue pixels sensitive to visible light and video information captured using infrared pixels sensitive to infrared light for display depending upon ambient conditions.

10. The device of claim 1, further including:
a motion sensor; and wherein the controller further provides:
determining difference information between a first and a second positional information from the motion sensor; and
computing movement information for the device with respect to a fixed point based upon the difference information.

11. The device of claim 1, further including:
one or more fasteners that fasten the imaging sensors and the illumination sources to a mounting surface in a wearable presentation device.

12. The device of claim 1, further including:
one or more fasteners that fasten the imaging sensors and the illumination sources to a cavity in a wearable presentation device.

13. The device of claim 1, further including:
one or more fasteners that fasten the imaging sensors and the illumination sources to a mounting surface in a portable presentation device.

14. The device of claim 1, further including:
one or more fasteners that fasten the imaging sensors and the illumination sources to a cavity in a portable presentation device.

15. The device of claim 1, further including the display of the live video feed including images of the hand grasping a real object.

16. The device of claim 15, further including the display of the live video feed including images of the hand grasping a virtual object.

17. The device of claim 1, further including the plurality of image sensors being disposed co-planar on a head mounted display.

18. The device of claim 17, the head mounted display including an optical assembly that displays a surrounding environment or a virtual environment to the user.

19. The device of claim 1, further including detecting a position and shape of a user's hand and projecting onto a display of a head-mounted device; wherein the user is presented with gestures in the display of the live video feed that reflecting hand motions of the user captured by the infrared pixels and interactively control objects in a virtual environment.

\* \* \* \* \*